United States Patent [19]

Asawa

[11] 4,087,689
[45] May 2, 1978

[54] BORESIGHTING SYSTEM FOR INFRARED OPTICAL RECEIVER AND TRANSMITTER

[75] Inventor: Charles K. Asawa, Pacific Palisades, Calif.

[73] Assignee: Hughes Aircraft Company, Culver City, Calif.

[21] Appl. No.: 744,071

[22] Filed: Nov. 22, 1976

[51] Int. Cl.² .............................................. H01J 31/49
[52] U.S. Cl. .................................... 250/342; 250/347
[58] Field of Search ................ 250/330, 334, 342, 347

[56] References Cited
U.S. PATENT DOCUMENTS

| | | | |
|---|---|---|---|
| B 437,195 | 1/1975 | Harris | 250/330 |
| 2,855,522 | 10/1958 | Robinson | 250/342 |
| 3,067,330 | 12/1962 | Hammar | 250/347 |
| 3,500,048 | 3/1970 | Menke | 250/342 |
| 3,600,581 | 8/1971 | Menke | 250/330 |

*Primary Examiner*—Harold A. Dixon
*Attorney, Agent, or Firm*—Walter J. Adam; W. H. MacAllister

[57] ABSTRACT

Accurate pointing of an infrared receiver or transmitter is provided by boresighting using a special beamsplitter and visible spectrum transmitting optics. The beamsplitter reflects the infrared signal and transmits visible light which permits sighting through the receiver field optics for accurate boresighting or pointing.

12 Claims, 6 Drawing Figures

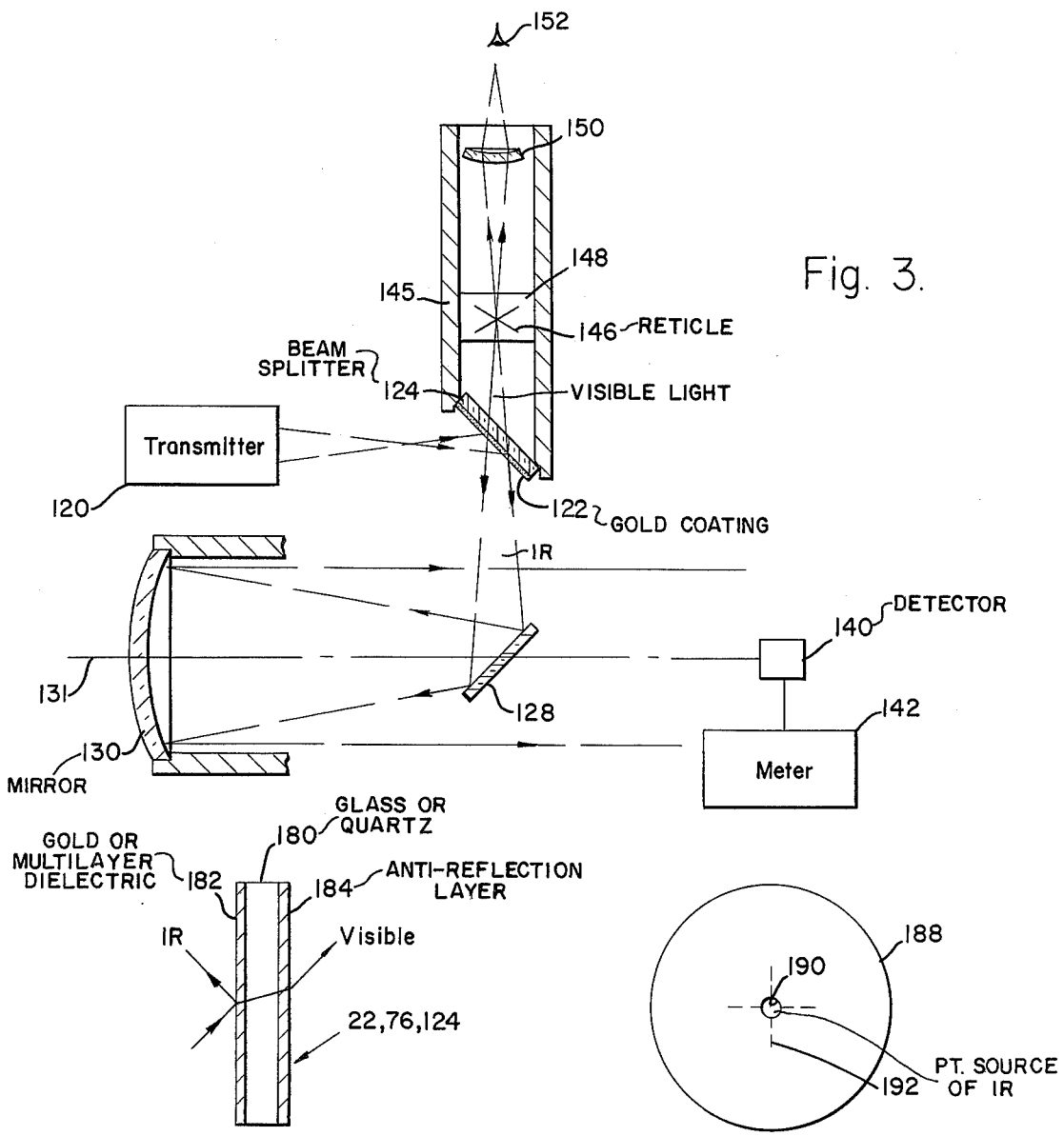

BORESIGHTING SYSTEM FOR INFRARED OPTICAL RECEIVER AND TRANSMITTER

BACKGROUND OF THE INVENTION

1. Field of the Invention

This invention relates to infrared systems and particularly to a boresighting system for infrared receivers and transmitters.

2. Description of the Prior Art

Boresighting either of a permanent type or for pointing of an infrared receiver has conventionally been performed by a sighting telescope that is mounted parallel to the receiver telescope. Parallel telescopes have inherent problems of alignment and of parallax, and in some systems discs or other structure prevent using a parallel telescope. A system that can be aligned without a separate parallel sighting telescope by utilizing the optics of the infrared telescope would be a substantial advance to the art.

SUMMARY OF THE INVENTION

A system for accurately boresighting an infrared (IR) receiver or transmitter that includes a special beamsplitter and visible spectrum transmitting optics in combination with the infrared optics. The beamsplitter is positioned to receive the infrared signal between the IR telescope and a detector or detector array and passes visible light through a sighting telescope including a reticle. The boresighting may then be performed by an initial alignment procedure of moving the telescope so that the target is substantially in the center of the field of view followed by moving either detector or the reticle to alignment with the target. The final step is to move the detector to a position that provides maximum return energy. Also within the scope of the invention the IR telescope may be moved to maximize the received energy at the detector followed by aligning the reticle. The beamsplitter may be constructed of a substrate window with a thin layer of suitable material such as gold deposited on the front surface so as to reflect about 98 percent of the infrared radiation from 3 to beyond 10 micrometers and to pass about 40 percent of the visible light through the beamsplitter.

It is therefore an object of this invention to provide an accurate and simplified boresighting system for infrared receivers and transmitters.

It is another object of this invention to provide a boresighting system that utilizes the IR receiver or transmitter field optics.

It is a further object of this invention to provide a boresighting system for infrared units that does not require a field of view parallel to the infrared telescope.

It is still another object of this invention to provide a boresighting or pointing system for infrared receivers either of the direct detection or heterodyne type.

BRIEF DESCRIPTION OF THE DRAWINGS

These and other objects, features and advantages of the invention as well as the invention itself will become more apparent to those skilled in the art in the light of the following detailed description taken in consideration with the accompanying drawings wherein like reference numerals indicate like or corresponding parts throughout the several views wherein:

FIG. 3 is a schematic diagram of an IR transmitter including boresighting in accordance with the invention.

FIG. 4 is a schematic sectional view of the beamsplitter that may be utilized in the systems of FIGS. 1, 2 and 3 in accordance with the invention.

FIG. 5 is a schematic drawing showing the target and reticle for further explaining the boresighting systems of the invention; and FIG. 6 is a schematic diagram of a detector array for explaining the operation of the boresighting system when an array is utilized.

DETAILED DESCRIPTION OF THE INVENTION

Figure 1:
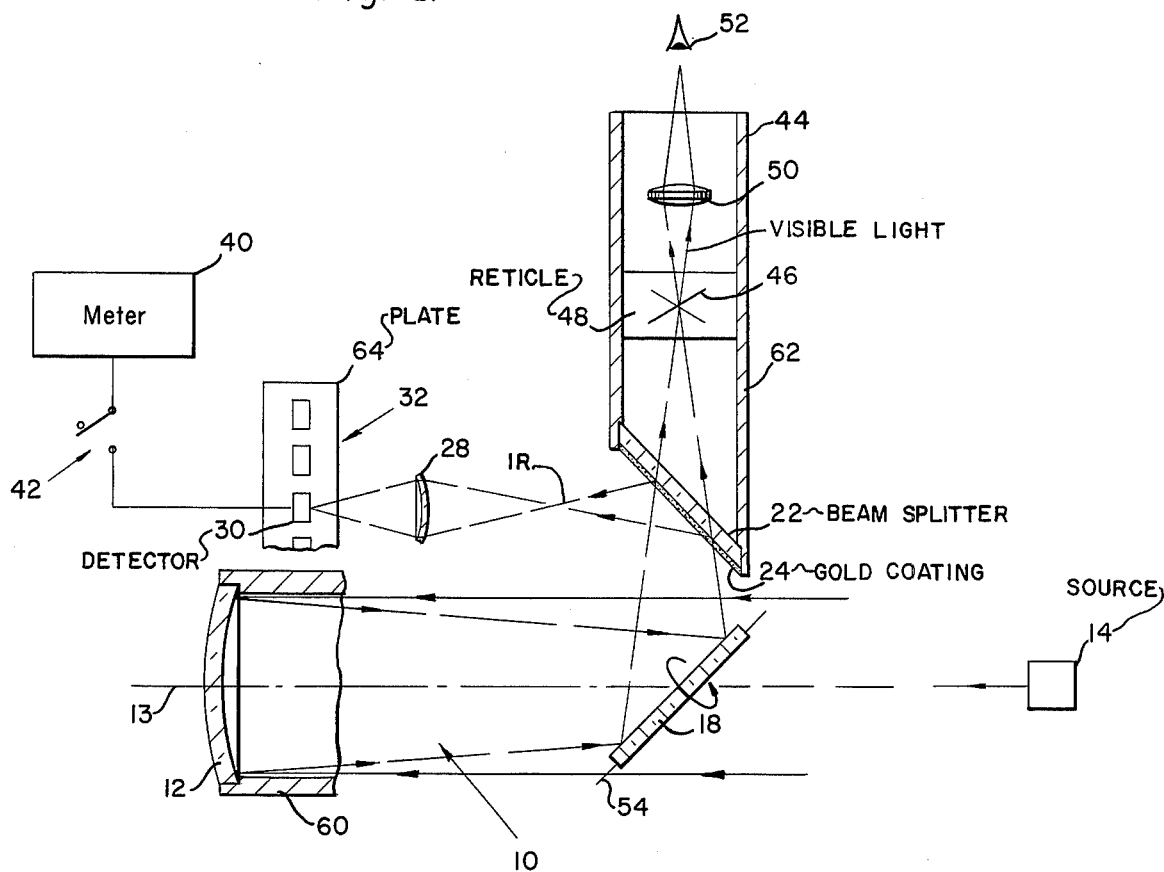
FIG. 1 is a schematic diagram of a direct detection IR receiver including boresighting in accordance with the invention.

Referring first to FIG. 1 which shows a direct detection IR receiver including the boresighting concept in accordance with the invention, a telescope 10 having a boresight axis 13 includes a mirror 12 reflecting infrared (IR) energy received from a source or target 14, the mirror 12 being curved to provide a converging beam to the surface of a diagonal mirror 18. The IR signal is then reflected from the surface of the mirror 18 as a converging beam to a beamsplitter 22 where the IR energy is reflected from a surface 24 which may be a suitable metal such as gold. The reflected IR energy after passing through a focal point is applied to a concave IR lens 28 where it is focused onto the surface of a detector 30 of a detector structure 32. Depending on the type of IR system the detector structure 32 may include only the single detector 30, may be a linear array of detectors as shown, or may be a two dimensional array of detectors. The current signals from the detector structure 32 may be applied to suitable display equipment (not shown) as is well known in the art. For the boresighting system, a current meter 40 is coupled through a switch 42 to the IR detector 30 for determining the maximum current which is representative of a boresight condition. The detector structure 32 may be movable to establish the boresight by moving a plate 64. Boresighting is defined as the condition when a receiver or transmitter is pointing to a defined point so as to receive or transmit the maximum energy from or to that point. The boresight axis defines the pointing direction for receiving or transmitting maximum energy.

The beamsplitter 22 passes visible light or a portion of the visible light into a sighting telescope 44 including a reticle 46 which may be crosshairs on a plate 48 for example or may be a generated reticle such as by a liquid crystal structure. The beam from the beamsplitter 22 may be focused substantially at the reticle 46 and then diverge to an eyepiece lens 50 where it is converged to focus at the position of an operator's eye 52. For an IR receiver that scans the IR signal across a detector array that is either linear or two dimensional, the diagonal mirror 18 may be rotated in an oscillating fashion through a selected angle around an axis 54 as is well known in the art. Mechanical structures 60 and 62 are shown to illustrate that the optical structure is retained by suitable mounting structure with the sighting telescope 44 being normally fixedly mounted to the IR telescope 10. For boresighting the receiver of FIG. 1, after approximate pointing, the plate 48 is moved until the reticle is aligned with the source 14 which may be a point source and the plate 64 is moved until a maximum current is determined on the meter 40. In another boresighting method in accordance with the invention the sighting telescope 10 is moved until maximum current is provided by the detector 30 and the reticle plate 64 is then moved to alignment.

Figure 2:
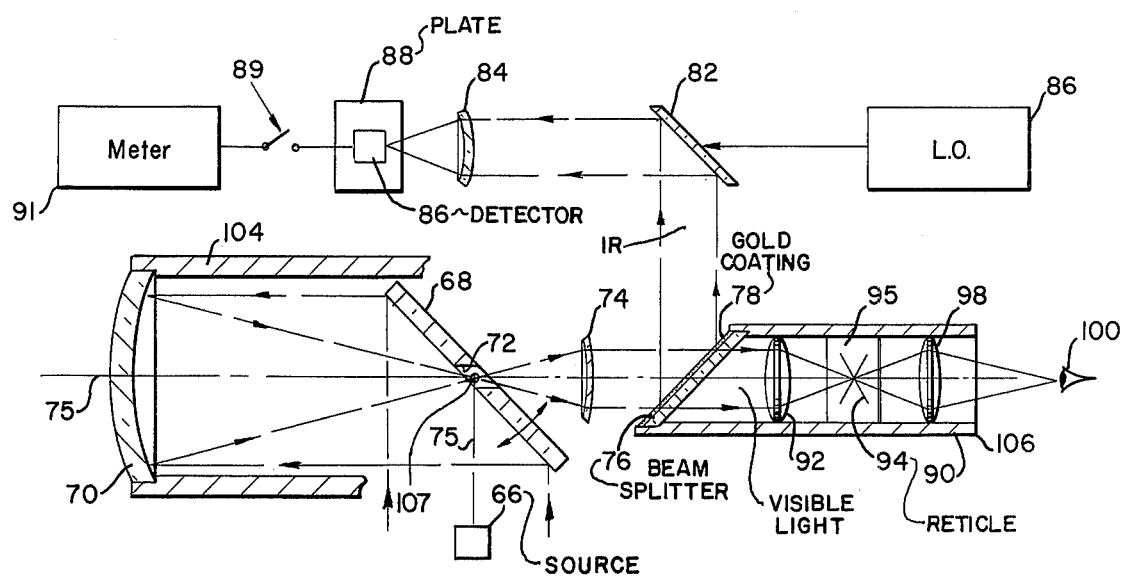
FIG. 2 is a schematic diagram of a heterodyne IR receiver including boresighting in accordance with the invention.

Referring now to the heterodyne IR receiver of FIG. 2, the IR energy is received from a target or source 66 on the surface of a diagonal mirror 68 and is reflected to the surface of a telescope mirror 70 of a telescope 69 where it is reflected as a converging beam substantially focused at an aperature 72 in the diagonal mirror 68. The telescope 69 has a boresight axis 75. The beam then passes from the aperature 72 as a diverging beam to a collimating lens 74 where it is transmitted as a parallel beam to a beamsplitter 76 having a reflective surface 78 of a suitable material such as gold to reflect a substantial portion of the infrared energy. The reflected signal is then applied to a beamsplitter 82 which may be germanium or zinc selenide or any suitable arrangement to function as a mixer. A local oscillator 86 which may be a suitable laser applies a signal to the beamsplitter 82 and the heterodyned IR signal passes to a convex lens after passing through a focal point, from which it is then passed as a converging beam to a detector 86 or a detector plate 88 which may include a plurality of detectors similar to plate 64 of FIG. 1. For scanning a detector array on the plate 88, the diagonal mirror 68 may be controlled to oscillate around an axis 107, which axis passes into the paper in FIG. 2.

The visible light passed through the beamsplitter 76 is applied as parallel rays to a double convex lens 92 and is then passed as a converging beam to a reticle 94. For moving the reticle 94 it may be mounted on a plate 95, but it is to be understood that any suitable reticle and reticle moving arrangement may be utilized as discussed relative to FIG. 1. The beam of visible light diverges to an eyepiece lens 98 where the light is passed to a substantial focal point at an operator's eye 100. The telescope 69 has enclosing and mounting structure 104 and the sighting telescope 90 has enclosing and mounting structure 106 both being mounted fixedly relative to each other. For boresighting, after initial alignment the plate 95 may be moved and the plate 88 is then moved until a maximum infrared signal or current is shown or detected on the meter 91 as an illustration of one alignment procedure in accordance with the invention.

Referring now to FIG. 3 which shows an IR transmitter utilizing the principles in accordance with the invention, the signal from a transmitter 120 which may include a laser is applied through a focal point to a surface 122 of a beamsplitter 124, the surface 122 being a suitable material for reflecting IR energy and transmitting visible energy. The IR signal is reflected to the surface of a diagonal mirror 128 of a telescope 129 and in turn to the surface of a curved telescope mirror 130 where it is reflected as a collimated beam to a detector which functions as the boresighting target. The telescope 129 has a boresight axis 131 along which maximum energy is transmitted. A meter 142 is coupled to the detector 140 for determining the maximum detector current corresponding to a boresight pointing condition of the telescope 129.

The visible light from the detector 140 is transmitted through the beamsplitter 124 into a sighting telescope 145 and converges at a reticle 146 mounted on a movable plate 148. Any suitable reticle arrangement may be utilized as discussed relative to FIGS. 1 and 2. The visible light is then passed to an eyepiece lens 150 where it is substantially focused for viewing by an operator at an eye 152. For boresighting the transmitter, the IR telescope 129 and the sighting telescope 145 are pointed at the detector 40 until a maximum current is provided by the meter 142. The reticle 146 is then moved by moving the plate 148 until the operator sees the target or detector 140 centered on the crosshairs. The plate 148 may then be fixed in the sighting telescope 145 and the transmitter is boresighted for future sightings. The sighting in the system of FIG. 3 may be performed when the transmitter is not active. The eyepiece lenses in FIGS. 1, 2 and 3 may be an erecting eyepiece if desired.

Referring now to FIG. 4, the beamsplitter that may be utilized in the systems of the invention may be formed of a visible transmitting material 180 such as glass or quartz on which is deposited a thin layer 182 of material suitable for reflecting IR energy such as gold or copper. For a thin layer of gold, about one micron thick, about 98 percent of the infrared radiation from 3 to beyond 10 microns will be reflected while about 40 percent of the visible light passes through the thin gold sheet. Though the visible light transmitted is mostly in the blue and green spectra region with a minimum of the red spectral region, the scene is readily discernible to the human eye. The spectral reflectance of initial films is described in the book by P. W. Kruse, L. D. McGlauchlin and R. B. McQuistan, *Elements of Infrared Technology*, John Wiley and Sons, N.Y., 1963, pp. 119–138. The layer 182 may, for example, also be copper or may be a multilayer dielectric film or coating. In order to minimize reflections the other surface of the structure 180 may be coated with a conventional anti-reflection layer 184.

Referring now to FIG. 5 the scene that may be seen by the IR receivers of FIGS. 1 and 2 is shown by an area 188 with a point source of IR energy 190 substantially centered therein. Upon boresighting the reticle 192 which corresponds to the reticles 46 and 94, it is centered on the point source of energy. In the heterodyne receiver of FIG. 2, the scene that can be seen through the aperature 72 may only be a few diameters larger than the point source 190, so that it may be necessary to utilize an auxiliary sighting device for approximate alignment of the telescope with the area of the IR energy source. For the transmitter of FIG. 3, the point source 190 and reticle 192 appear similar to that shown upon reaching a boresight condition.

FIG. 6 shows a detector 194 corresponding to detectors 30 and 86 of the IR receivers for controlling the boresighting in a linear array 196 or in a two dimensional array 198 which may also be utilized in accordance with the principles of the invention for scanning systems with the mirrors 18 and 68 being controlled to oscillate. It is to be understood that the principles of the invention are not to be limited to the particular array scanning arrangements but any suitable scanning system may be utilized.

Thus there has been described IR receivers and transmitters that are boresighted by sighting through the IR telescope optics to allow accurate pointing. Alignment problems and parallax problems of conventional parallel sighting telescopes are substantially eliminated. The principles of the invention are not limited to the exact configurations of the illustrated receivers and transmitter but include all modifications within the scope of the invention.

What is claimed is:

1. A boresighting system comprising:
   an optical telescope for passing IR and visible energy along an optical path including a target;
   a beamsplitter in said optical path for reflecting a substantial portion of the IR energy and transmitting at least a portion of said visible energy;
   a sighting telescope positioned to receive the transmitted visible energy from said beamsplitter and including a sighting reticle;
   IR detector means in said optical path for responding to the level of IR energy and developing current; and
   meter means for responding to the detector current to determine a maximum current representative of a boresight condition.

2. The system of claim 1 in which said beamsplitter has a reflective surface positioned to reflect said substantial portion of IR energy.

3. The system of claim 2 in which said reflective surface is a thin layer of gold.

4. The system of claim 2 in which said reflective surface is a multilayer dielectric structure.

5. An infrared receiver including a boresight determining arrangement comprising:
   an infrared telescope for receiving energy from a source along an axis and including a diagonal mirror for reflecting said energy at a substantial angle from said axis;
   beamsplitter means responsive to the received energy reflected from said diagonal mirror for reflecting a substantial portion of the infrared energy and transmitting a substantial portion of the visible energy;
   detector means positioned to receive the reflected infrared energy;
   current determining means coupled to said detector means for indicating a maximum current; and
   a sighting telescope positioned to receive the visible transmitted energy from said beamsplitter and including a reticle for sighting to said source.

6. The combination of claim 5 in which said detector means is movable to provide a boresight to said reticle.

7. The combination of claim 5 in which said reticle is movable to a boresight when said infrared telescope is pointing with its boresight aligned with said source.

8. The combination of claim 5 in which said beamsplitter means includes a gold film deposited on a visible energy transmitting material for reflecting said IR energy.

9. An infrared receiver including a boresight arrangement comprising:
   a heterodyne receiver having an axis and including a diagonal mirror for receiving energy from a source;
   a telescope mirror for receiving energy from said diagonal mirror and reflecting said energy through an aperture in said diagonal mirror;
   beamsplitter means positioned to receive the energy passing through said aperture for reflecting a substantial portion of the IR energy and transmitting a substantial portion of the visible energy;
   detector means positioned to receive the reflected IR energy;
   current determining means coupled to said detector means; and
   a sighting telescope positioned to receive said transmitted visible energy and including a reticle for sighting said source.

10. The combination of claim 9 in which said reticle is movable to a boresight condition when a maximum current is provided to said current determining means.

11. A boresighting system for an IR transmitter including a transmitter source and an IR telescope having a boresight axis comprising:
    beamsplitter means responsive to the energy from said transmitter source for reflecting IR energy to said IR telescope along said boresight axis, said beamsplitter means transmitting visible energy received from said IR telescope;
    IR detector means positioned so as to be in the transmission path of said IR telescope;
    meter means coupled to said IR detector means; and
    a sighting telescope positioned to receive visible energy received from said detector means and transmitted through said beamsplitter means, said sighting telescope including a reticle for viewing said detector means.

12. The combination of claim 11 in which the reflective surface of said beamsplitter means is a deposited gold film.

* * * * *